(12) United States Patent
Qu et al.

(10) Patent No.: US 9,408,205 B2
(45) Date of Patent: *Aug. 2, 2016

(54) WIRELESS COMMUNICATION CONTROL CHANNEL APPARATUS AND METHOD

(71) Applicant: Futurewei Technologies, Inc., Plano, TX (US)

(72) Inventors: Bingyu Qu, Schaumburg, IL (US); Philippe Sartori, Algonquin, IL (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/986,480

(22) Filed: Dec. 31, 2015

(65) Prior Publication Data

US 2016/0119905 A1 Apr. 28, 2016

Related U.S. Application Data

(63) Continuation of application No. 14/642,281, filed on Mar. 9, 2015, now Pat. No. 9,258,815, which is a continuation of application No. 13/628,648, filed on Sep. 27, 2012, now Pat. No. 9,008,035.

(60) Provisional application No. 61/555,994, filed on Nov. 4, 2011, provisional application No. 61/540,678, filed on Sep. 29, 2011.

(51) Int. Cl.
*H04L 5/00* (2006.01)
*H04W 72/04* (2009.01)
*H04L 25/02* (2006.01)

(52) U.S. Cl.
CPC ........... *H04W 72/042* (2013.01); *H04L 5/0048* (2013.01); *H04L 25/0202* (2013.01)

(58) Field of Classification Search
CPC ... H04L 5/0016; H04L 5/0048; H04L 5/0023; H04L 25/0226; H04L 5/0053; H04L 5/0035; H04L 5/0007; H04L 25/0202; H04L 25/024; H04L 27/2695; H04W 72/0493; H04W 24/08; H04W 72/042; H04J 13/0048; H04J 13/18; H04B 7/0632
USPC .......... 370/328, 329, 330, 335, 336; 455/219, 455/260, 295
See application file for complete search history.

(56) References Cited

U.S. PATENT DOCUMENTS

2011/0268062 A1* 11/2011 Ji .......................... H04L 5/0055 370/329

(Continued)

OTHER PUBLICATIONS

LG Electronics, "Discussion on DL Control Siganling Enhancement", May 2011, 3GPP TSG RAN WG1 Meeting #65, R1-111789, 3 Pages.*

*Primary Examiner* — Edan Orgad
*Assistant Examiner* — Ivan O Latorre
(74) *Attorney, Agent, or Firm* — Futurewei Technologies, Inc.

(57) ABSTRACT

An apparatus and method for control channel transmission in a wireless network are disclosed. A disclosure is provided with at least one resource block (RB) including a first control channel element associated with a first antenna port (AP) and a second control channel element associated with a second AP. The first and second control channel elements might be used for transmission of a single control channel, and a first reference signal sequence associated with one of the first AP and the second AP is selected for transmission of the single control channel based on a control channel element index value, such that a resource element of the at least one RB can be detected to decode the first control channel element and the second control channel element.

10 Claims, 20 Drawing Sheets

(56) References Cited

U.S. PATENT DOCUMENTS

2012/0213261 A1* 8/2012 Sayana ............... H04L 5/0094 375/224
2012/0320848 A1* 12/2012 Chen .................. H04L 5/0055 370/329
2013/0044727 A1* 2/2013 Nory .................. H04L 5/0092 370/330
2013/0064216 A1* 3/2013 Gao ................... H04L 5/0016 370/330
2013/0208677 A1* 8/2013 Lee .................... H04L 5/0094 370/329

* cited by examiner

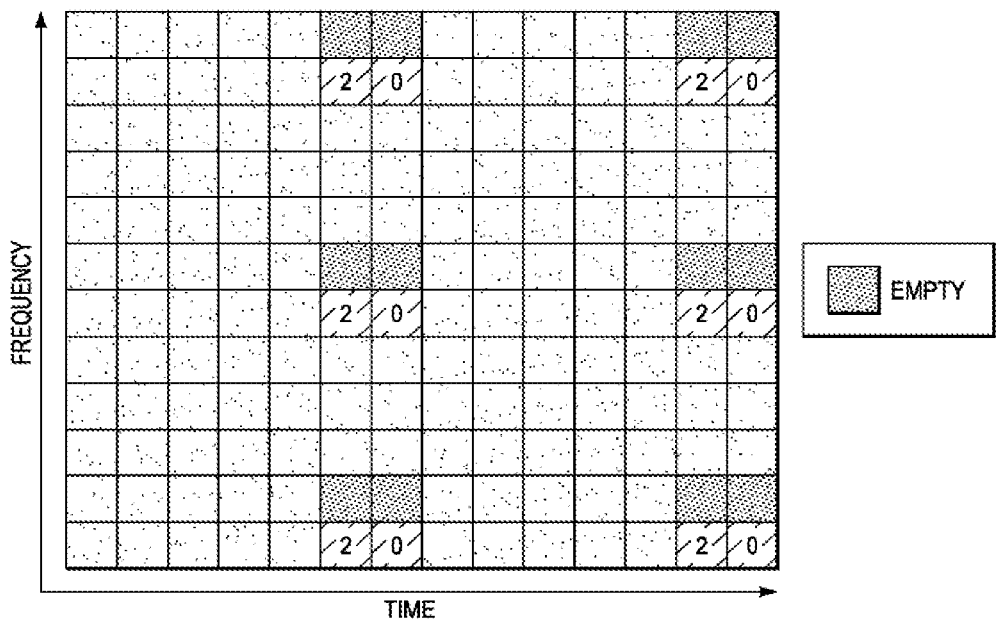

FIG. 8

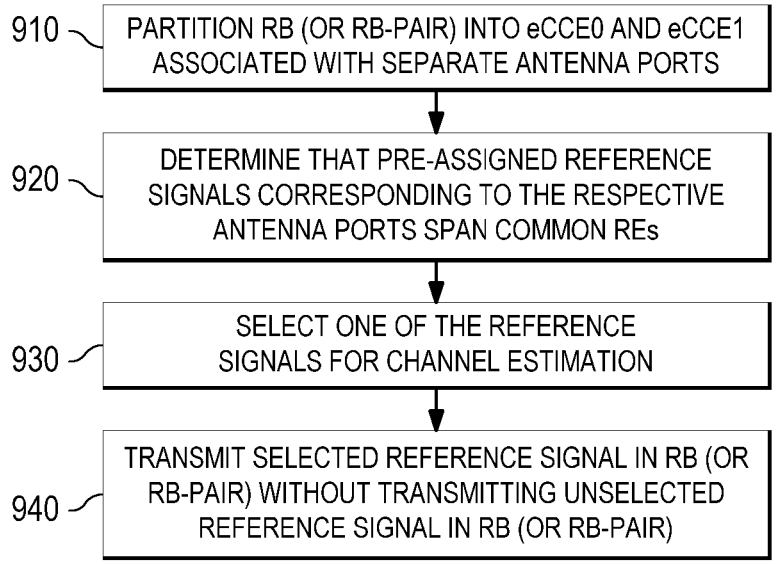

FIG. 9

910 — PARTITION RB (OR RB-PAIR) INTO eCCE0 AND eCCE1 ASSOCIATED WITH SEPARATE ANTENNA PORTS

920 — DETERMINE THAT PRE-ASSIGNED REFERENCE SIGNALS CORRESPONDING TO THE RESPECTIVE ANTENNA PORTS SPAN COMMON REs

930 — SELECT ONE OF THE REFERENCE SIGNALS FOR CHANNEL ESTIMATION

940 — TRANSMIT SELECTED REFERENCE SIGNAL IN RB (OR RB-PAIR) WITHOUT TRANSMITTING UNSELECTED REFERENCE SIGNAL IN RB (OR RB-PAIR)

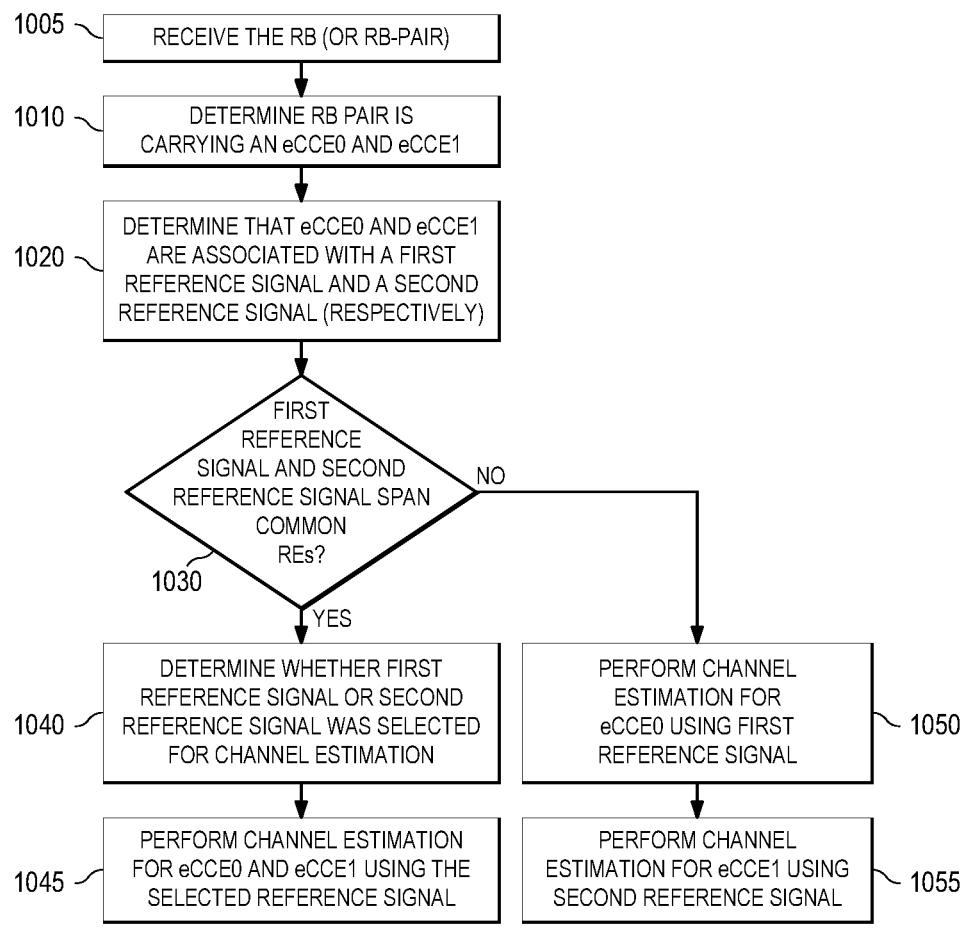

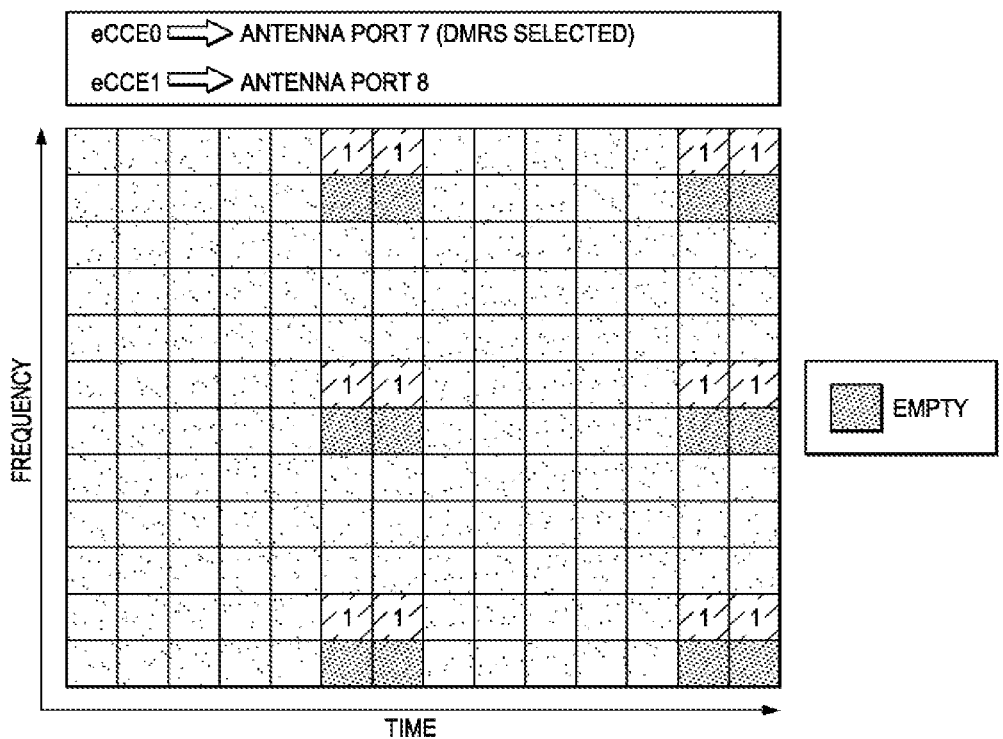

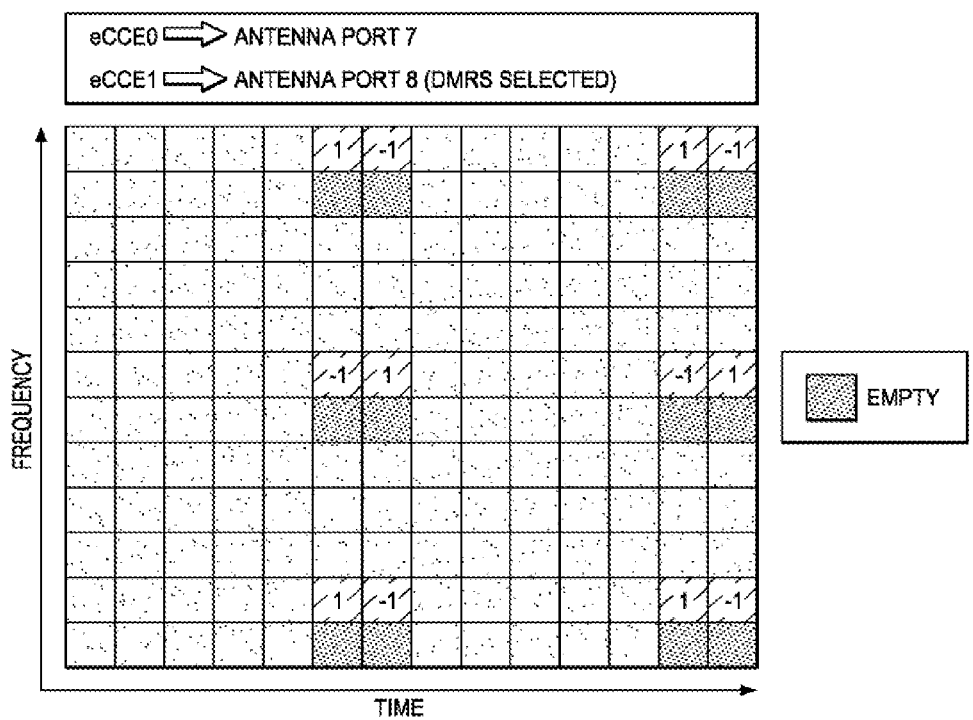

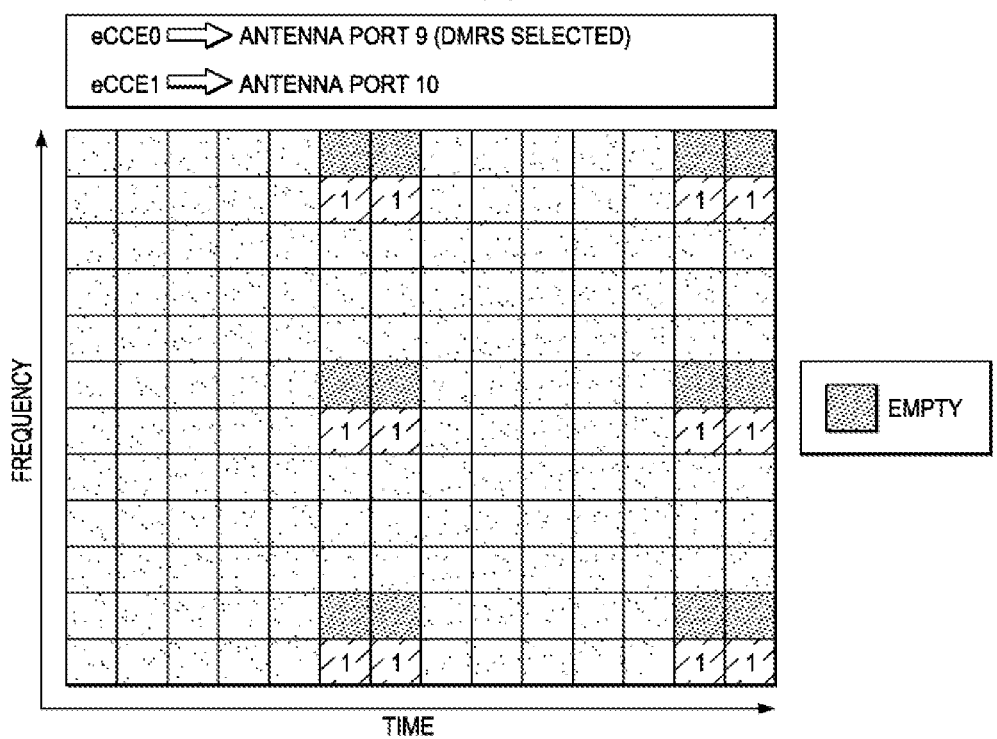

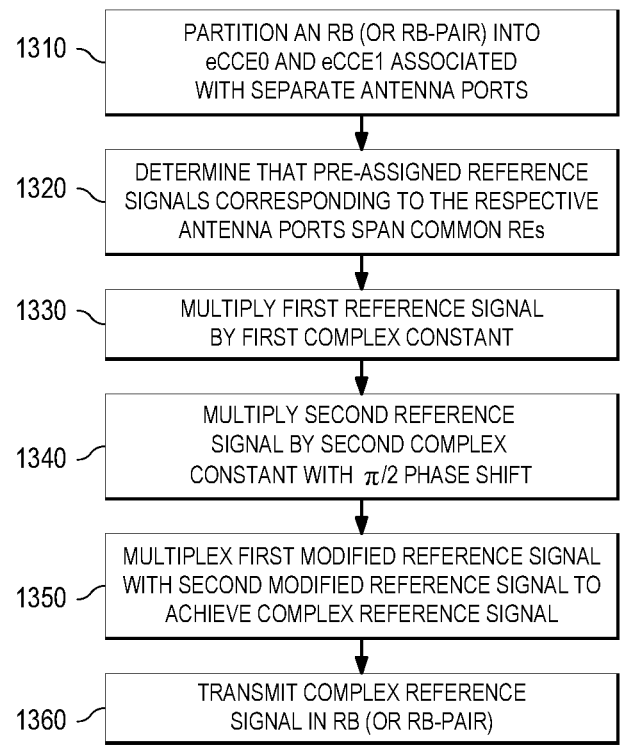

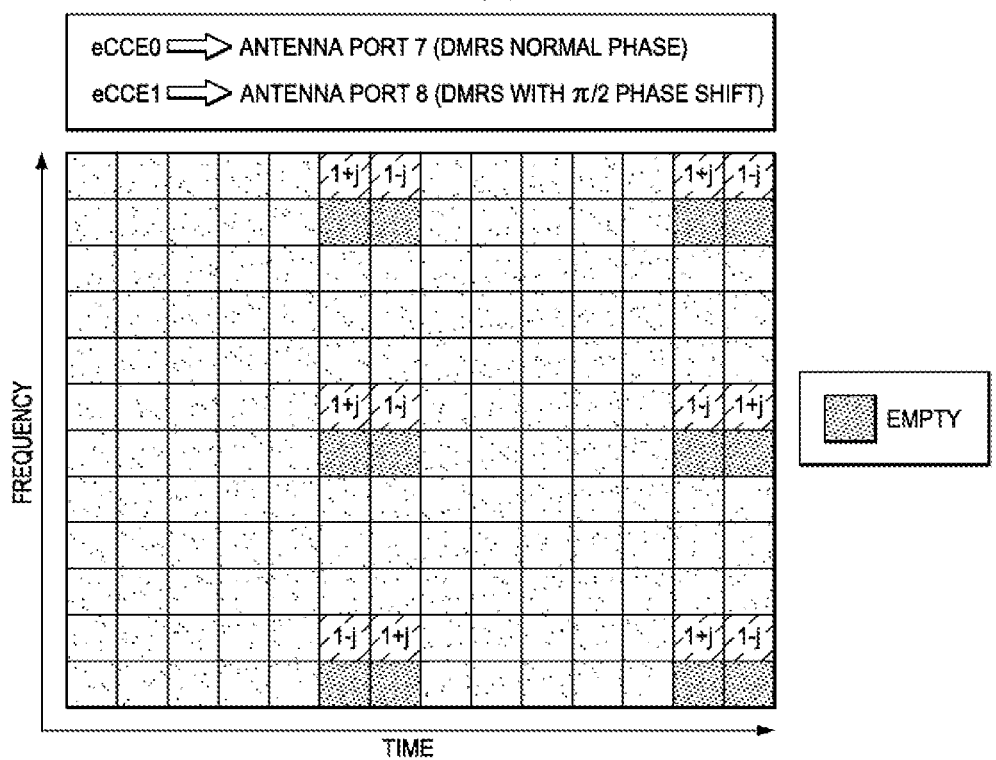

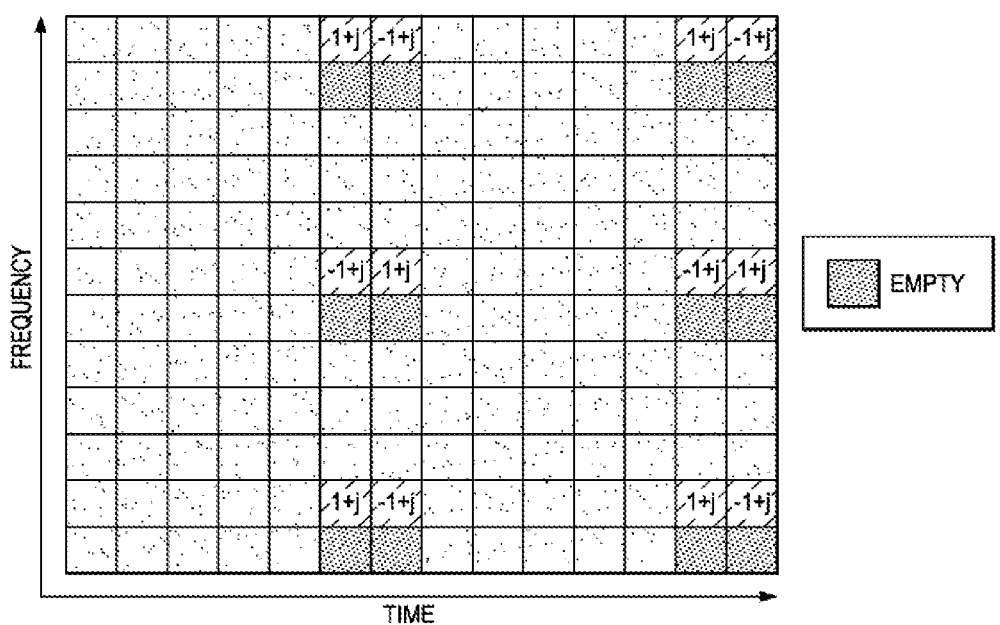

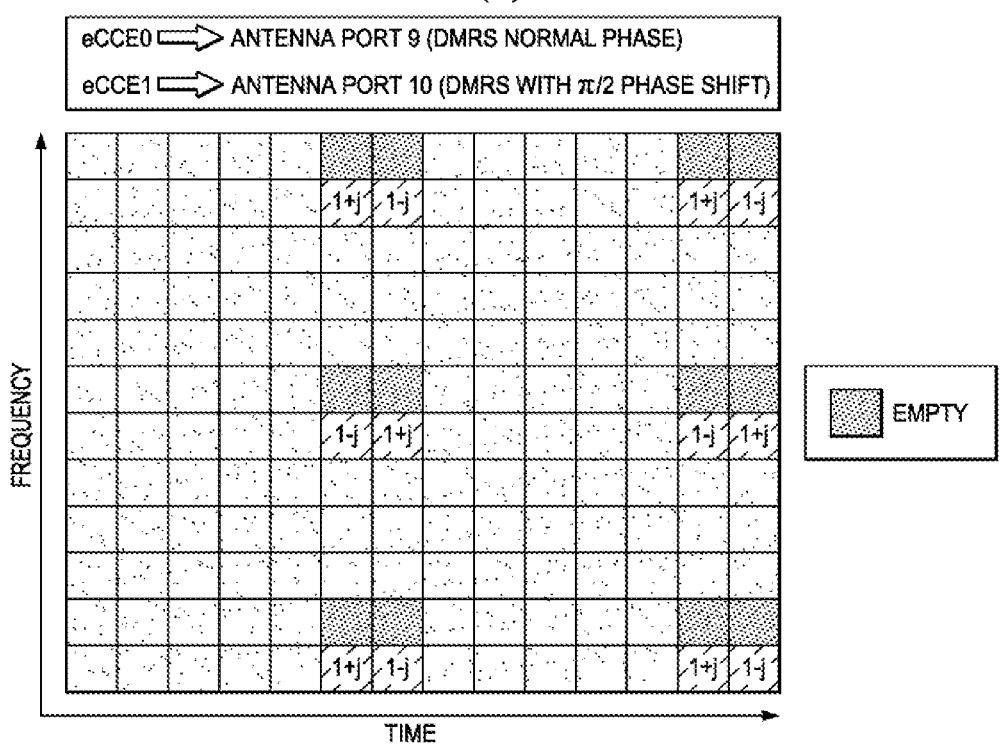

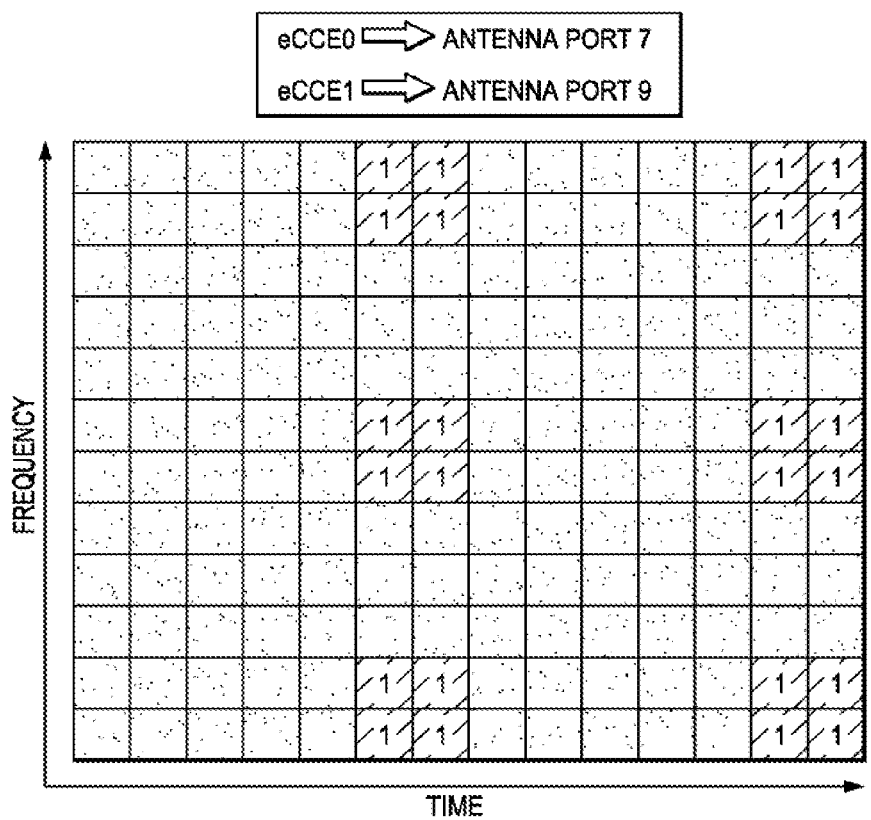

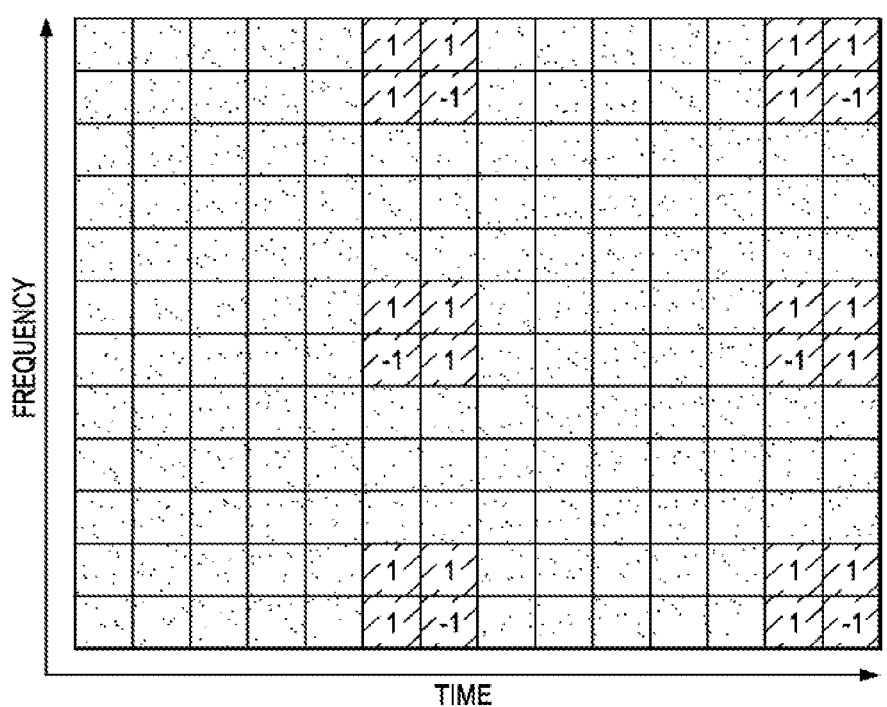

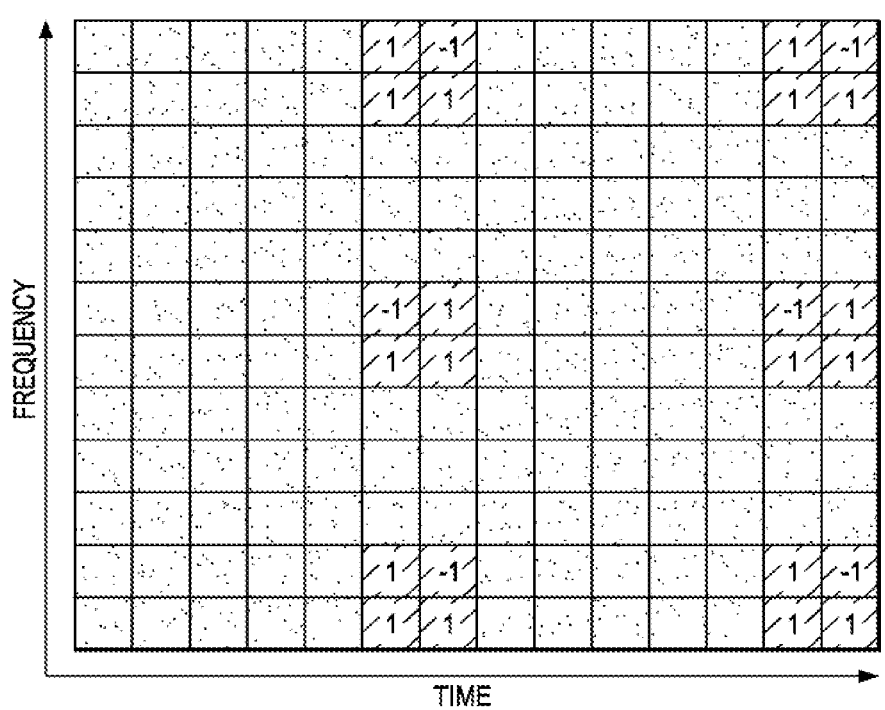

WIRELESS COMMUNICATION CONTROL CHANNEL APPARATUS AND METHOD

This application is a continuation application of U.S. Non-Provisional application Ser. No. 13/628,648 filed on Sep. 27, 2012, entitled "Wireless Communication Control Channel Systems and Methods," which claims benefit of U.S. Provisional Application No. 61/540,678 filed on Sep. 29, 2011, entitled "Wireless Communication Control Channel Systems and Methods," U.S. Provisional Application No. 61/555,994 filed on Nov. 4, 2011, entitled "Wireless Communication Control Channel Systems and Methods," and U.S. Non-Provisional application Ser. No. 14/642,281 filed on Mar. 9, 2015, entitled "Wireless Communication Control Channel Apparatus and Method," all of which are hereby incorporated herein by reference as if reproduced in their entireties.

TECHNICAL FIELD

The present invention relates to wireless communication apparatus and method, and, in particular embodiments, to wireless communication control channel apparatus and method.

BACKGROUND

Wireless communications networks often use a control channel to communicate control information (e.g., resource allocation, modulation, and coding information, etc.) pertaining to a data channel. For instance, third generation partnership project (3GPP) Long Term Evolution (LTE) release 10 (rel-10) specifies communicating control information of a Physical Downlink Shared Channel (PDSCH) using a Physical Downlink Control Channel (PDCCH). The PDCCH is located in the control region of the sub-frame (which spans the first few leading symbols of the subframe), while the PDSCH is located in the data region of the subframe (which spans the remaining/trailing symbols of the subframe). Other control channels may also occupy the control region of the subframe. For instance, the control channel may include a Physical Hybrid Indicator Channel (PHICH) for carrying acknowledgment (ACK) and negative-acknowledgment (NACK) messages in response to uplink data transmissions and a Physical Control Format Indicator Channel (PCFICH) for indicating the number of symbols of control region in a subframe.

One proposed modification for future releases of LTE (e.g., 3GPP LTE-A release 11 (rel-11), etc.) is the introduction of an enhanced PDCCH (E-PDCCH) in the downlink subframe. The E-PDCCH may be used to carry uplink (UL) and/or downlink (DL) control signaling regarding the PDSCH and/or the physical uplink shared channel (PUSCH) to user equipments (UEs). Unlike previous control channels, the E-PDCCH will be located (at least partially) in the data region of the subframe, and may be frequency division multiplexed (FDM) with the PDSCH.

There may be multiple E-PDCCHs to communicate multiple control messages in a single PRB pair using time-division-multiplexing (TDM) techniques, frequency division multiplexing (FDM) techniques, spatial division multiplexing (SDM) techniques, or combinations thereof. This ability to communicate multiple resource allocations in a single RB is particularly beneficial when high order modulation techniques are used, e.g., 16 quadrature amplitude modulation (QAM), etc. When an RB (or RB-pair) carries multiple control messages using TDM or FDM techniques, it is necessary to partition the RB (or RB-pair) by mapping available REs to multiple control channel elements (CCE). In this disclosure, CCEs of the E-PDDCH may be referred to as enhanced CCEs (eCCEs). For instance, an RB or RB-pair may be partitioned between a first eCCE (eCCE0) and a second eCCE (eCCE1).

It is desirable to evenly partition an RB (or RB pair) amongst the multiple eCCEs such that each eCCE is assigned/allocated the same number of REs. However, evenly partitioning an RB amongst multiple eCCEs is complicated by the existence of overhead information (e.g., reference signals, etc.) within the RB or RB pair carrying the E-PDCCH, which may be used for, inter alia, channel estimation (e.g., fading, etc.). Notably, the number and position of the overhead REs in the RB or RB pair varies depending on the configuration of the downlink channel, which means that an even partitioning of the RB or RB-pair cannot generally be achieved through a simple bifurcation of the RB or RB pair (e.g., splitting the RB in half along the time domain or frequency domain). That is to say, the sporadic and uneven interspersion of overhead REs within the RB or RB pair carrying the E-PDCCH would, more often than not, cause one of the halves to carry more overhead (and therefore fewer available REs) than the other. As such, a mechanism or technique for evenly partitioning the E-PDCCH between two or more resource allocations is desired.

SUMMARY

Technical advantages are generally achieved, by embodiments of the present invention which describe wireless communication control channel systems and methods.

In one embodiment, a method for allocating resources in a wireless network is provided. In this example, the method includes transmitting a control channel in a resource block (RB) or RB-pair. The control channel comprises a first control channel element that is associated with a first antenna port and a second control channel element that is associated with a second antenna port. The first antenna port is pre-assigned a first reference signal and the second antenna port is pre-assigned a second reference signal. The method further includes selecting one of the first reference signal and the second reference signal, and transmitting the selected reference signal in the RB or RB-pair. The selected reference signal is transmitted to enable channel estimation for both the first control channel element and the second control channel element at a receiver side. An apparatus for performing this method is also provided.

In another embodiment, a user equipment (UE) is in a wireless network is provided. In this example, the UE is configured to receive a RB or RB-pair carrying a control channel that comprises a first control channel element associated with a first antenna port and a second control channel element associated with a second antenna port. The first antenna port is pre-assigned a first reference signal and the second antenna port is pre-assigned a second reference signal. The UE is further configured to identify either the first reference signal or the second reference signal as being selected for channel estimation, and to perform channel estimation using the selected reference signal to decode the first control channel element and the second control channel element.

In yet another embodiment, a method for communicating an enhanced Physical Downlink Control Channel (E-PDCCH) is provided. In this example, the method includes communicating the E-PDCCH over a first enhanced control channel element (eCCE) and a second eCCE of a resource block (RB) or RB-pair of a long term evolution (LTE) sub-frame. The first eCCE corresponds to a first antenna port and the second eCCE corresponds to a second antenna port. The first antenna port is associated with a first demodulation reference signal (DMRS) and the second antenna port is associated with a second DMRS. The method further includes determining that the first antenna port is selected for E-PDCCH demodulation, and transmitting the first DMRS in the RB or RB-Pair without transmitting the second DMRS in the RB or RB-Pair, wherein the first DMRS is transmitted to enable channel estimation for both the first eCCE and the second eCCE.

In yet another embodiment, another method for allocating resources in a wireless network is provided. In this example, the method includes transmitting a control channel in an RB or RB-pair. The control channel comprises a first control channel element that is associated with a first antenna port and a second control channel element that is associated with a second antenna port. The first antenna port is pre-assigned a first reference signal and the second antenna port is pre-assigned a second reference signal. The method further includes assigning a first modified Walsh code to the first reference signal and assigning a second modified Walsh code to the second reference signal. The first modified Walsh code comprises a first complex constant the second modified Walsh code comprising a second complex constant. The second complex constant and the first complex constant have a non-zero phase difference. The method further includes transmitting, in the RB or RB-pair, both the first reference signal in accordance with the first modified WALSH code and the second reference signal in accordance with the second modified Walsh code. The first reference signal is transmitted to enable channel estimation for the first control channel element and the second reference signal is transmitted to enable channel estimation for the second control channel element. An apparatus for performing this method is also provided.

In yet another embodiment, another method for allocating resources in a wireless network is provided. In this example, the method includes transmitting a control channel in a resource block (RB) or RB-pair. The control channel comprises a first control channel element and a second control channel element. The method further comprises associating the first control channel element with a first one of a plurality of antenna ports having a first pre-assigned reference signal, identifying a second one of the plurality of antenna ports having a second pre-assigned reference signal that does not overlap with the first pre-assigned reference signal in time-frequency domain, associating the second control channel element with the second antenna port, and transmitting the first pre-assigned reference signal and the second pre-assigned reference signal in an overhead portion of the RB or RB-pair.

In yet another embodiment, a method for evenly partitioning a control channel between a first control channel element and a second control channel element is provided. In this example, the method includes identifying available ones of a plurality of resource elements (REs) of a resource block (RB) pair. The plurality of REs occupy a plurality of time-slots spanning a plurality of sub-carrier frequencies. The method further comprises allocating a first set of the available REs to the first control channel element. The first set of the available REs include all available REs that occupy: odd ones of the plurality of timeslots spanning odd ones of the plurality of sub-carrier frequencies; and even ones of the plurality of timeslots spanning even ones of the plurality of sub-carrier frequencies. The method further includes allocating a second set of the available REs to the second control channel element. The second set of the available REs include all available REs that occupy: even ones of the plurality of timeslots spanning odd ones of the plurality of sub-carrier frequencies; and odd ones of the plurality of timeslots spanning even ones of the plurality of sub-carrier frequencies.

BRIEF DESCRIPTION OF THE DRAWINGS

For a more complete understanding of the present invention, and the advantages thereof, reference is now made to the following descriptions taken in conjunction with the accompanying drawing, in which:

FIG. 8 illustrates a diagram of a zero power problem that occurs in an RB (or-RB pair) carries two DMRSs corresponding to antenna ports 9 and 10;

FIG. 9 illustrates a flowchart of an embodiment of a method for avoiding the zero power problem when transmitting an RB or RB pair carrying an E-PDCCH that is associated with two antenna ports having overlapping reference signals;

FIG. 10 illustrates a flowchart of a method for receiving the RB or RB pair communicated by the method depicted in FIG. 9;

FIG. 11(a) illustrates a diagram of an embodiment of an RB or RB pair that is communicated according to the method depicted in FIG. 9;

FIG. 11(b) illustrates a diagram of another embodiment of an RB or RB pair that is communicated according to the method depicted in FIG. 9;

FIG. 12(a) illustrates a diagram of yet another embodiment of an RB or RB pair that is communicated according to the method depicted in FIG. 9;

FIG. 13 illustrates a flowchart of another embodiment of a method for avoiding the zero power problem when transmitting an RB or RB pair carrying an E-PDCCH that is associated with two antenna ports having overlapping reference signals;

FIG. 14(a) illustrates a diagram of an embodiment of an RB or RB pair that is communicated according to the method depicted in FIG. 13;

FIG. 14(b) illustrates a diagram of another embodiment of an RB or RB pair that is communicated according to the method depicted in FIG. 13;

FIG. 15(a) illustrates a diagram of a yet another embodiment of an RB or RB pair that is communicated according to the method depicted in FIG. 13;

FIG. 16(*b*) illustrates a diagram of another embodiment of an RB or RB pair that includes resource allocations that are selectively allocated to antenna ports that do not have overlapping DMRSs;

FIG. 16(*c*) illustrates a diagram of yet another embodiment of an RB or RB pair that includes resource allocations that are selectively allocated to antenna ports that do not have overlapping DMRSs;

FIG. 16(*d*) illustrates a diagram of yet another embodiment of an RB or RB pair that includes resource allocations that are selectively allocated to antenna ports that do not have overlapping DMRSs;

DETAILED DESCRIPTION OF ILLUSTRATIVE EMBODIMENTS

The making and using of the presently described embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. For example, embodiments generally are described for evolved NodeBs (eNBs) and user equipments (UEs) for LTE rel-11 and later, but embodiments may be applied to other types of wireless communications systems such as IEEE 802.16.

Figure 6:
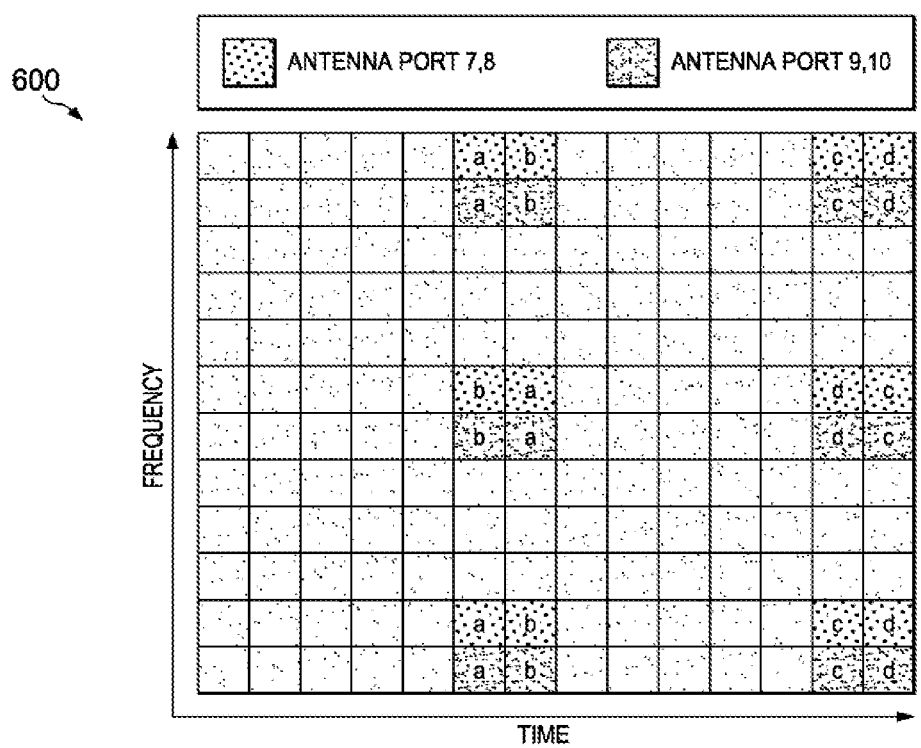
FIG. 6 illustrates a diagram of the REs reserved for carrying DMRS symbols corresponding to antenna ports 7, 8, 9, and 10 for a normal Cyclic Prefix (CP) length.

An issue relates to a zero power problem that may arise when the E-PDCCH comprises two eCCEs or two resource partitions associated with antenna ports whose reference signals span the same REs (e.g., antenna port 7 and 8, etc.). Some aspects of this disclosure may be discussed in the context of 3GPP LTE-A release-10 (and other LTE standards). However, aspects of this disclosure are not so limited, and may be applicable to other contexts as well. As an example, a zero power problem may occur when a DMRS (in accordance with the 3GPP LTE-A release-10 standard) intended for a PDSCH is used for E-PDCCH. DMRS with antenna ports 7, 8, 9, 10, 11, 12, 13, 14 have been defined in 3GPP 36.211 release 10. As illustrated in FIG. 6, the DMRSs for antenna ports 7 and 8 are code-division multiplexed, and the DMRSs of antenna ports 9 and 10 are also code-division multiplexed. Conversely, for example, the DMRSs of antenna ports 7 and 9 are time-frequency orthogonal. The Walsh code used for a DMRS is <a,b,c,d>, which is modulated in the REs of DMRS as indicated in FIG. 6. DMRS of Antenna port 4 has the Walsh code <a,b,c,d>=<1,1,1,1>, DMRS of antenna port 5 has the Walsh code <a,b,c,d>=<1,−1,1,−1>.

In LTE, each eCCE or resource partition may be associated with an antenna port that corresponds to a specific set of spatial resources, for example a beamforming vector or a precoding vector in the spatial domain. To facilitate demodulation, each eCCE or resource partition is typically accompanied by a reference signal (e.g., transmitted in the same RB or RB-pair) that is pre-associated with the corresponding antenna port. These reference signals may be known signals (e.g., a known Walsh sequence) that are detected by the UE for purposes of estimating channel characteristics (e.g., fading, etc.). Because each resource partition may be associated with a different antenna port, an RB pair carrying multiple eCCEs may typically also carry a separate reference signal for each eCCE. For instance, an RB-pair carrying an eCCE0 and an eCCE1 corresponding to antenna ports 7 and 8 (respectively) may typically carry two separate demodulation reference signals (DMRS)—one for antenna port 7 and another for antenna port 8. In one embodiment, multiple eCCEs in an RB-pair may be allocated to multiple E-PDCCHs in order to carry multiple control messages in the RB pair. In the same or other embodiments, multiple eCCEs in an RB-pair may be allocated to one E-PDCCH in order to ensure better performance for the single E-PDCCH. However, a zero power problem occurs when an E-PDCCH is allocated multiple resource partitions whose reference signals span the same REs. For instance, an RB (or RB-pair) carrying a DMRS for antenna port 7 and a DMRS for antenna port 8 (both of which being allocated to the same E-PDCCH) would have a zero power problem, as the second and fourth symbols of the respective Walsh codes <1,1,1,1> and <1,−1,1,−1> would, in effect, cancel one another out (i.e., result in <2,0,2,0>). This zero power problem is undesirable in so far as it inhibits channel estimation by the UE. As such, mechanisms and/or techniques for avoiding the aforementioned zero power problem are desired.

Some aspects of this disclosure disclose techniques for evenly partitioning an RB (or RB-pair) into two or more control channel elements (CCEs), one or more of which may be designated as an enhanced control channel element (eCCE) for carrying an E-PDCCH (or portion thereof). Specifically, a checkerboard partitioning technique is used to assign (or partition) available REs (e.g., REs not reserved for overhead) to a first control channel element (e.g., an eCCE0) and a second control channel element (e.g., an eCCE1). Notably, this checkerboard partitioning technique achieves an even apportionment of available REs between the eCCE0 and the eCCE1 irrespective of the amount and/or positioning of overhead in the RB (or RB-pair). Additionally, this checkerboard partitioning technique can be used for partitioning an RB (or RB-pair) amongst three or more control channel elements (e.g., three eCCEs, four eCCEs, etc.)

Other aspects of this disclosure suggest techniques for avoiding a zero power problem when an RB or RB-pair comprises two (or more) control channel elements whose corresponding respective reference signals span the same or common REs. In one embodiment, the zero power problem is avoided by selecting one of the reference signals for channel estimation, and then including the selected reference signal in the RB (or RB-pair), while omitting the unselected reference signal from the RB (or RB-pair). For instance, when an RB or RB-pair comprises two control channel elements corresponding to antenna ports 7 and 8 (respectively), the DMRS corresponding to antenna port 7 may be selected for E-PDCCH channel estimation, and the DMRS corresponding to antenna port 8 may be omitted (i.e., not transmitted in the RB or RB-pair for the E-PDCCH). Upon reception of the E-PDCCH, the UE may be configured to use the DMRS corresponding to antenna port 7 to perform channel estimation for the two resource partitions of the E-PDCCH (i.e., including the portion of the E-PDCCH carrying to the second resource partition corresponding to antenna port 8). Alternatively, the DMRS corresponding to antenna port 8 may be selected, and the DMRS corresponding to antenna port 7 may be omitted (i.e., not transmitted in the RB or RB-pair for the E-PDCCH).

In another embodiment, the zero power problem may be avoided by using an I, Q multiplexing technique to combine the respective reference signals into a complex reference signal, which may then be transmitted in the common REs. Specifically, the I, Q multiplexing technique may apply a phase shift to one of the reference signals such that the two reference signals may be multiplexed together to form a complex reference signal. For instance, the DMRSs for antenna ports 7 and 8 may be combined by multiplying the DMRS for antenna port 8 by a complex constant having a phase shift of $\pi/2$, and then multiplexing the phase-shifted DMRS for antenna port 8 with the DMRS for antenna port 7. As a result, the DMRS for antenna port 7<1, 1, 1, 1> and the modified DMRS for antenna port 8<j, -j, j, -j> combine to generate a complex DMRS <1+j, 1-j, 1+j, 1-j>, which may then be transmitted in the common REs to avoid the aforementioned zero power problem.

Figure 1:
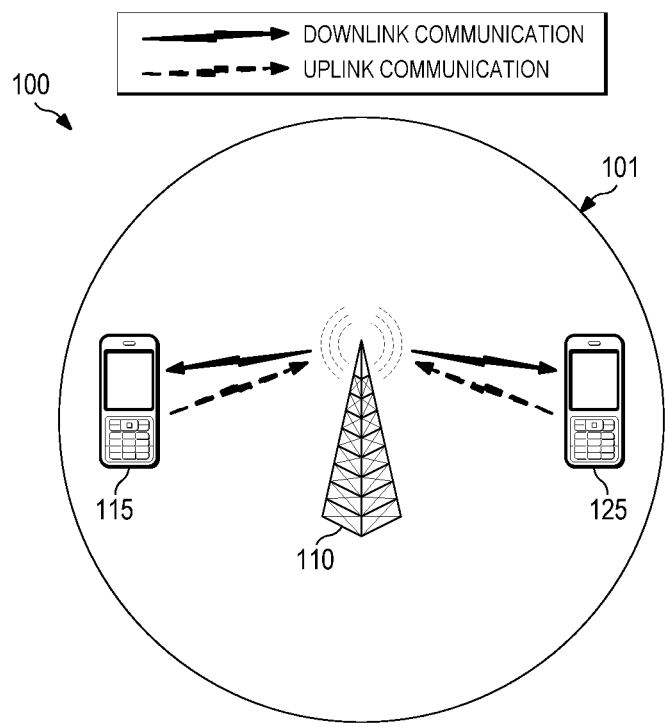
FIG. 1 illustrates a diagram of an embodiment of a wireless communications network.

FIG. 1 illustrates a wireless network 100 comprising a cellular coverage area 101 within which an eNB 110 provides wireless access to a plurality of UEs 115, 125. The eNB 110 may provide wireless access by establishing downlink communication links (solid arrows) and uplink communication links (dashed arrows) with the UEs 115,125. In an embodiment, the wireless network 100 may operate in accordance with an LTE communication protocol. In such an embodiment, the downlink communications may include a PDCCH, a PDSCH, and an E-PDCCH, while the uplink communications channel may include a data channel (e.g., a physical uplink shared channel (PUSCH). The PDSCH and PUSCH may include network resources (e.g., time-frequency resources in the form of blocks (RBs)), which may be assigned to the UEs 115, 125 through signaling carried in the PDCCH and/or the E-PDCCH.

Figure 2:
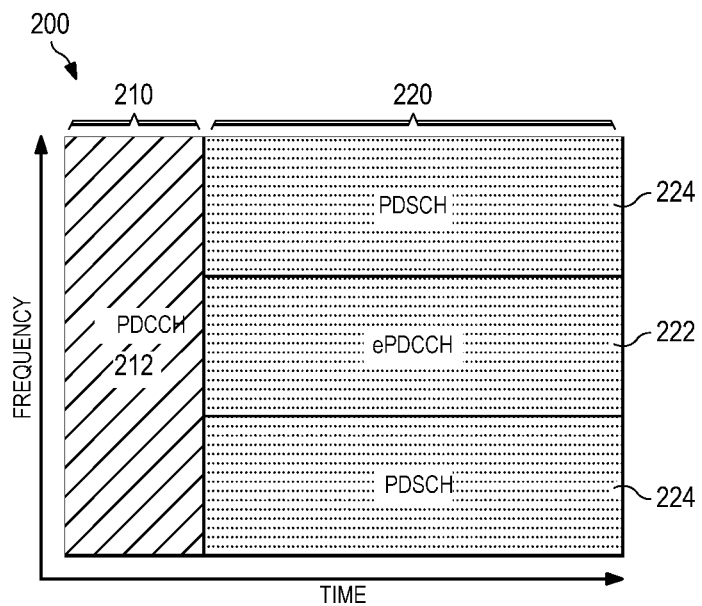
FIG. 2 illustrates a diagram of a block of time-frequency resources for carrying wireless transmissions.

FIG. 2 illustrates a block of time-frequency resources 200 for carrying downlink communications over the downlink communication link. As shown, the block of time-frequency resources 200 are segmented into a control region 210 and a data region 220. The control region 210 is occupied by a PDCCH 212, while the data region 220 is occupied by an E-PDCCH 222 and a PDSCH 224. The E-PDCCH 222 may be used for carrying uplink and downlink grant information. In some embodiments, the E-PDCCH 222 may extend into the control region 210.

Figure 3:
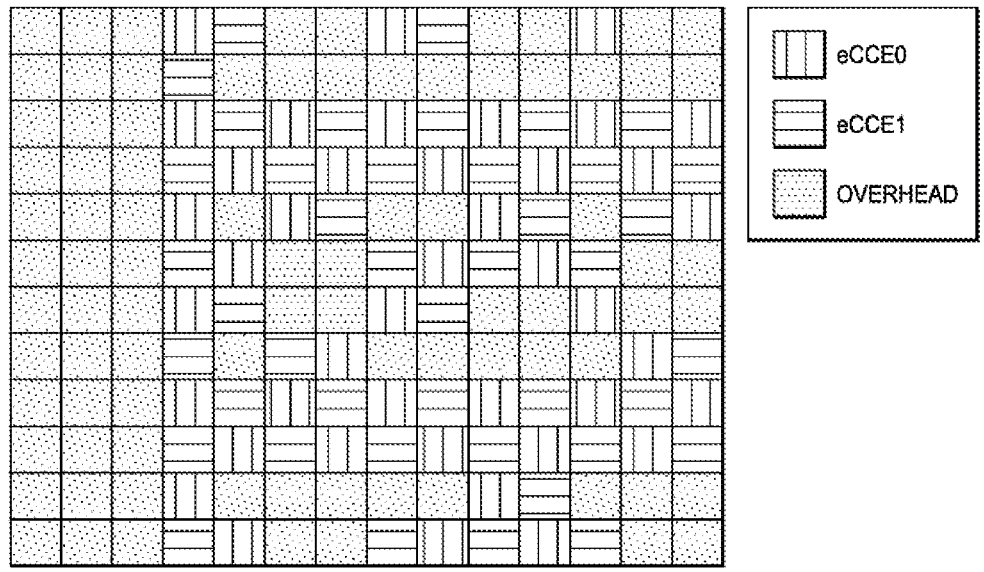
FIG. 3 illustrates a diagram of an embodiment of a RB that has been partitioned using a checkerboard partitioning technique.

As mentioned above, one challenge in implementing the E-PDCCH is to evenly partition an RB (or RB-pair) amongst multiple control channel elements. Specifically, and in accordance with aspects of this disclosure, even apportionment of the RB pair (or RB-pair) is achieved using a checkerboard partitioning technique. FIG. 3 illustrates an RB 300 that has been evenly partitioned using to a checkerboard partitioning technique. As shown, the RB 300 comprises a plurality of REs, which are classified as either overhead REs (dotted squares) or available RS (striped squares). The overhead REs in the RB 300 is reserved for carrying overhead information, such as reference signals used for channel estimation. The available REs in the RB 300 carry control information (e.g., grant information) of an E-PDCCH. The available REs are evenly partitioned between a first control channel element mapping to an eCCE0 index and a second control channel element mapping to an eCCE1 index. For purposes of clarity and concision, control channel elements may be referred to as eCCEs throughout this disclosure. In some embodiments, the eCCE0 and eCCE1 may carry grant information for the same UE, while, in other embodiments, the eCCE0 and eCCE1 may carry grant information for different UEs.

Notably, the RB 300 is evenly partitioned such that equal numbers of available REs are allocated to the eCCE0 and the eCCE1, resulting in a checkerboard type pattern. When there are two control channel elements eCCE0 and eCCE1, checkerboard partitioning is achieved by assigning to the eCCE0 all available REs that occupy odd timeslots spanning odd sub-carrier frequencies, and all available REs that occupy even timeslots spanning even sub-carrier frequencies, while assigning to the eCCE1 all remaining available REs (e.g., all available REs occupying even timeslots spanning odd sub-carrier frequencies and odd timeslots spanning even sub-carrier frequencies).

Figure 4:
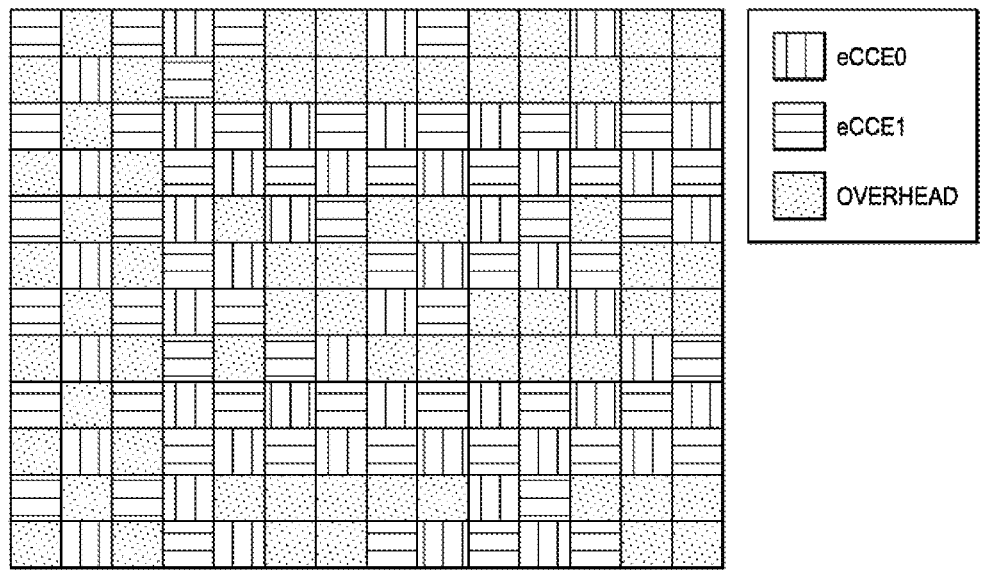
FIG. 4 illustrates a diagram of another embodiment of a RB that has been partitioned using a derivative of the checkerboard partitioning technique.

Advantageously, the checkerboard partitioning technique achieves even partitioning irrespective of the overhead pattern/configuration. FIG. 4 illustrates an RB 400 carrying resource allocations mapping to the eCCE0 and the eCCE1. As shown, the RB 400 is evenly partitioned between the eCCE0 and the eCCE1, even though the RB 400 has a different overhead configuration than the RB 300. Hence, the checkerboard partitioning technique achieves even partitioning irrespective of the overhead pattern/configuration.

Figure 5:
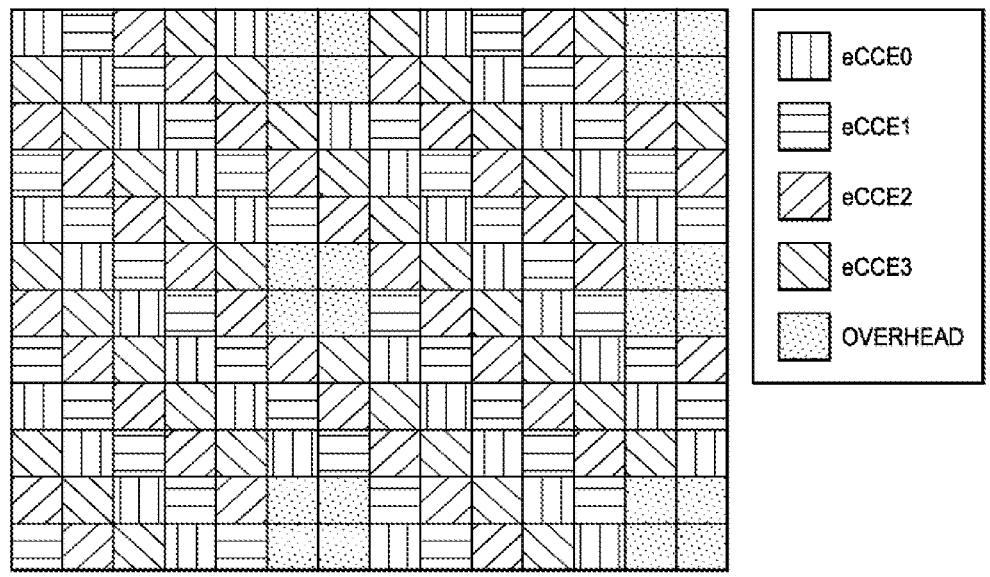
FIG. 5 illustrates a diagram of an embodiment of a RB that has been partitioned using a derivative of the checkerboard partitioning technique.

Additionally, the checkerboard partitioning technique is adaptable for an RB or RB-pair carrying three or more control channel elements. FIG. 5 illustrates an RB 500 carrying an four control channel elements, including an eCCE0, an eCCE1, an eCCE2, and an eCCE3. As shown, the available REs of the RB 500 are evenly apportioned amongst the four control channel elements (eCCE0-eCCE3) using an adapted version of the checkerboard partitioning technique. Notably the checkerboard partitioning technique may be further adapted to evenly partition the available REs of an RB (or RB-pair) amongst three control channel elements, as well as amongst five or more control channel elements. The checkerboard partitioning technique may also be implemented to partition an RB or RB-pair into regions for carrying distinct channels. For instance, an RB or RB-pair could be partitioned such that an E-DPCCH may be multiplexed with a PDSCH.

An eCCE is associated with an antenna port (AP) so that the UE knows where to look for the DMRS sequence in the RB or RB-pair, and which Orthogonal Cover Code (OCC) to use for channel estimation. Specifically, the eNB assigns APs to eCCEs based on an AP-to-eCCE mapping rule, which is known by (or communicated to) the UE. Accordingly, the UE applies the AP-to-eCCE mapping rule to identify which AP to use when attempting to decode an E-PDCCH/eCCE based on the RE location. The AP-to-eCCE mapping rule may be communicated by higher layer signaling, or may be a priori determined and written in the standard specification documents.

With this AP-to-eCCE mapping rule, each eCCE is mapped to an AP (e.g., one AP for each eCCE), and hence an RB or RB-pair carrying multiple eCCEs also carries multiple reference signals (as identified by the APs mapped to the eCCEs). Including multiple reference signals within an RB or RB-pair may be advantageous in some situations (e.g., when an E-PDCCH is transmitted using a diversity mode). However, in other situations, it may be preferable to use a single reference signal. In such situations, a pre-defined rule may be implemented so that one AP is used for multiple eCCEs of a single E-PDCCH transmission. For instance, the UE may use the AP associated with the eCCE with the lowest index.

Further and as mentioned above, another challenge when implementing the E-PDCCH relates to a zero power problem that occurs when an RB or RB-pair carries two reference signals that span common REs. Specifically, when an RB or RB-pair carries two or more control channel elements (e.g., each of which being associated with a different antenna port), the RB or RB-pair also carries a separate reference signal (e.g., DMRS or otherwise) for each control channel element (e.g., so that the UE can perform channel estimation). When the RB or RB-pair carries two reference signals that span common REs, the symbols of the respective reference signals may cancel one another out, thereby causing a zero power problem to occur. FIG. 6 illustrates a model RB 600 for carrying reference signal symbols for antenna ports 7, 8, 9, and 10 of the LTE family of communications protocols. As shown, the respective DMRSs for antenna ports 7 and 8 span the same REs, and the REs for antenna ports 9 and 10 span the same REs. The Walsh Codes <a, b, c, d> for antenna ports 9-10 are as follows: antenna port 7<1, 1, 1, 1>; antenna port 8<1, −1, 1, −1>; antenna port 9<1, 1, 1, 1>; and antenna port 10 <1, −1, 1, −1>.

Notably, the zero power problem generally arises when the two control channel elements associated with conflicting reference signals are intended for a single user. That is to say, the zero power problem may not be present when the control channel elements associated with conflicting reference signals are intended for different users, because the conflicting reference symbols may be differentiated from one another in the code domain (e.g., such as by multiplying different constants).

Figure 7:
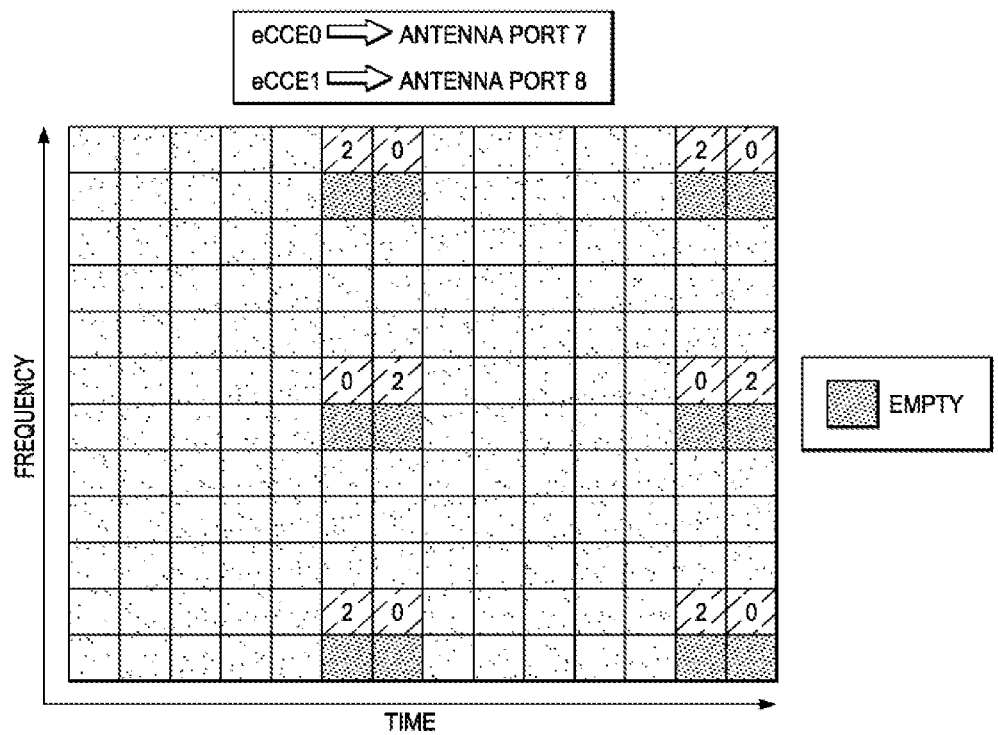
FIG. 7 illustrates a diagram of a zero power problem that occurs in when an RB (or RB-pair) carries two DMRSs corresponding to antenna ports 7 and 8.

FIGS. 7 and 8 illustrate two examples of how the zero power problem arises in conventional LTE frames. FIG. 7 illustrates an RB 700 carrying an eCCE0 and an eCCE1 corresponding to antenna ports 7 and 8 (respectively). As shown, a zero power problem occurs when the DMRS for antenna port 7 (e.g., <1, 1, 1, 1>) and the DMRS for antenna port 8 (e.g., <1, −1, 1, −1>) are transmitted together in the RB 700, as the REs carrying symbols b and d have zero amplitude. FIG. 8 illustrates how a similar problem occurs when an RB 800 carries an eCCE0 and an eCCE1 corresponding to antenna ports 9 and 10 (respectively).

One solution to the zero power problem is to select one of the two reference signals to use for channel estimation, and omit the unselected reference signal from the RB or RB-pair entirely. Notably, discussions relating to the omission of a reference signal from an RB or RB-pair may be in the context of a single code domain, e.g., as might be assigned to a single user, and therefore should not be interpreted as preventing the unselected reference signal from being transmitted in the RB or RB-pair in a different code domain, e.g., as might be assigned to another user.

FIG. 9 illustrates a method 900 for RB or RB-transmission, which includes selecting one of two overlapping reference signals for channel estimation to avoid the zero power problem that plagues the prior art. The method 900 begins at step 910, where an eNB partitions an RB or RB-pair amongst an eCCE0 and an eCCE1. The eCCE0 and the eCCE1 are associated with separate antenna ports. Next, the method 900 proceeds to step 920, where eNB determines that the reference signals pre-assigned to the antenna ports span common REs. For instance, it may be determined that the eCCE0 and the eCCE1 are associated with antenna ports 7 and 8 (respectively), or, alternatively, with antenna ports 9 and 10 (respectively). Next, the method 900 proceeds to step 930, where one of the two reference signals is selected for channel estimation. The selected reference signal will be included in the RB or RB-pair, and will be used to perform channel estimation for both the eCCE0 and eCCE1, while the unselected reference signal will be omitted from (i.e., not transmitted in) the RB or RB-pair and, therefore, will not be available for channel estimation. The method 900 then proceeds to step 940, where the selected reference signal is transmitted in the RB or RB-pair.

FIG. 10 illustrates a method 1000 for receiving RB or RB-pair transmitted by the method 900. The method 1000 begins at step 1005, where the UE receives the RB or RB-pair. Next, the method 1000 proceeds to step 1010, where the UE determines that the RB or RB-pair is carrying two control channel elements, namely an eCCE0 and an eCCE1. Next, the method 1000 proceeds to step 1020, where the UE determines that the eCCE0 and eCCE1 are associated with a first reference signal and a second reference signal (respectively). Next, the method 1000 proceeds to step 1030, where the UE determines whether the first reference signal and the second reference signal span common REs.

If the determination in step 1030 is that the respective reference signals span the same REs, then the method 1000 proceeds to step 1040, where the UE determines which of the two reference signals was selected for channel estimation. In some embodiments, this determination may be made according with a predefined rule. For instance, the pre-defined rule may state that if resource allocations corresponding to antenna ports 7 and 8 are transmitted in the same RB or RB-pair, then the DMRS corresponding with antenna port 7 will be selected for channel estimation. Thereafter, the method 1000 proceeds to step 1045, where the UE performs channel estimation using the selected reference signal. Performing channel estimation may include detecting the selected reference signal to determine channel fading and/or other channel characteristics of the air channel.

If the determination in step 1030 is that the respective reference signals do not span the same REs, then the method 1000 proceeds to step 1050, where the UE uses the first reference signal to perform channel estimation on the eCCE0. Thereafter, the method 1000 proceeds to step 1055, where the UE uses the second reference signal to perform channel estimation on the eCCE1.

FIG. 11(a) illustrates an embodiment of an RB 1100 that is communicated according to the method 900. The RB 1100 carries an eCCE0 corresponding to antenna port 7 and an eCCE1 corresponding to antenna port 8. In this example, the DMRS corresponding to antenna port 7 is selected for channel estimation, and therefore is transmitted in the RB 1100. The DMRS corresponding to antenna port 8 remains unselected, and is therefore not transmitted in the RB 1100.

FIG. 11(b) illustrates an embodiment of an RB 1150 that is communicated according to the method 900. The RB 1150 carries an eCCE0 corresponding to antenna port 7 and an eCCE1 corresponding to antenna port 8. In this example, the DMRS corresponding to antenna port 8 is selected for channel estimation, and therefore is transmitted in the RB 1150. The DMRS corresponding to antenna port 7 remains unselected, and is therefore not transmitted in the RB 1150.

FIG. 12(a) illustrates an embodiment of an RB 1200 that is communicated according to the method 900. The RB 1200 carries an eCCE0 corresponding to antenna port 9 and an eCCE1 corresponding to antenna port 10. In this example, the DMRS corresponding to antenna port 9 is selected for channel estimation, and therefore is transmitted in the RB 1200. The DMRS corresponding to antenna port 10 remains unselected, and is therefore not transmitted in the RB 1200.

Figure 12B:
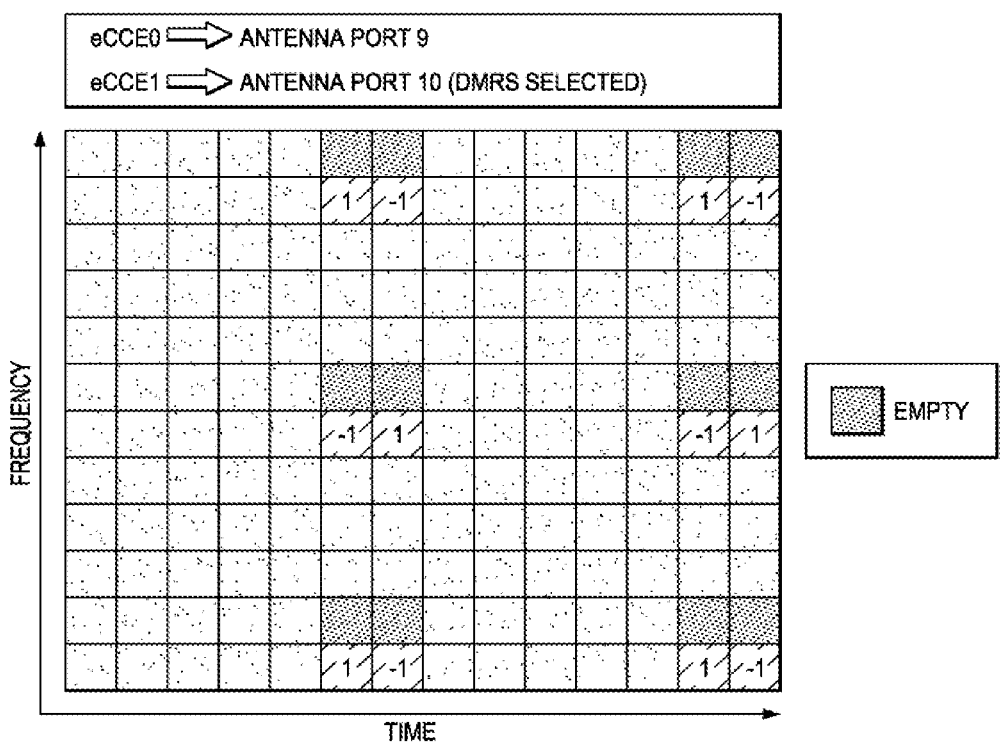
FIG. 12(b) illustrates a diagram of yet another embodiment of an RB or RB pair that is communicated according to the method depicted in FIG. 9.

FIG. 12(b) illustrates an embodiment of an RB 1250 that is communicated according to the method 900. The RB 1250 carries an eCCE0 corresponding to antenna port 9 and an eCCE1 corresponding to antenna port 10. In this example, the DMRS corresponding to antenna port 10 is selected for channel estimation, and therefore is transmitted in the RB 1250. The DMRS corresponding to antenna port 9 remains unselected, and is therefore not transmitted in the RB 1250.

Another solution to the zero power problem is to combine the respective reference signals (e.g., using I, Q multiplexing techniques) into a complex reference signal. FIG. 13 illustrates a method 1300 for RB or RB-pair transmission, which includes combining overlapping reference signals into a complex reference signal. The method 1300 begins at step 1310, where an eNB partitions an RB or RB-pair into an eCCE0 and an eCCE1. The eCCE0 and eCCE1 are associated with separate antenna ports. Next, the method 1300 proceeds to step 1320, where the eNB determines that the pre-assigned reference signals span common REs. Thereafter, the method 1300 proceeds to step 1330, where the first reference symbol is multiplied by a first complex constant. Next, the method 1300 proceeds to step 1340, where the second reference symbol is multiplied by a second complex constant having a $\pi/2$ phase difference with respect to the first complex constant. In some embodiments, the first complex constant may have a zero phase shift, and the second complex constant may have a $\pi/2$ phase shift. Thereafter, the method 1300 proceeds to step 1350, where the first modified reference signal and the second modified reference signal are multiplexed to achieve a complex reference signal. Subsequently, the method 1300 proceeds to step 1360, where the complex reference signal is transmitted in the RB or RB-pair.

FIG. 14(*a*) illustrates an embodiment of an RB 1400 that is communicated according to the method 1300. The RB 1400 carries an eCCE0 corresponding to antenna port 7 and an eCCE1 corresponding to antenna port 8. In this example, the DMRS corresponding to antenna port 8 is multiplied by a complex constant having a phase shift of $\pi/2$ such that the complex reference signal <1+j, 1−j, 1+j, 1−j> is communicated in the RB 1400.

FIG. 14(*b*) illustrates an embodiment of an RB 1450 that is communicated according to the method 1300. The RB 1450 carries an eCCE0 corresponding to antenna port 7 and an eCCE1 corresponding to antenna port 8. In this example, the DMRS corresponding to antenna port 7 is multiplied by a complex constant having a phase shift of $\pi/2$ such that the complex reference signal <1+j, −1+j, 1+j, −1+j> is communicated in the RB 1450.

Figure 15B:
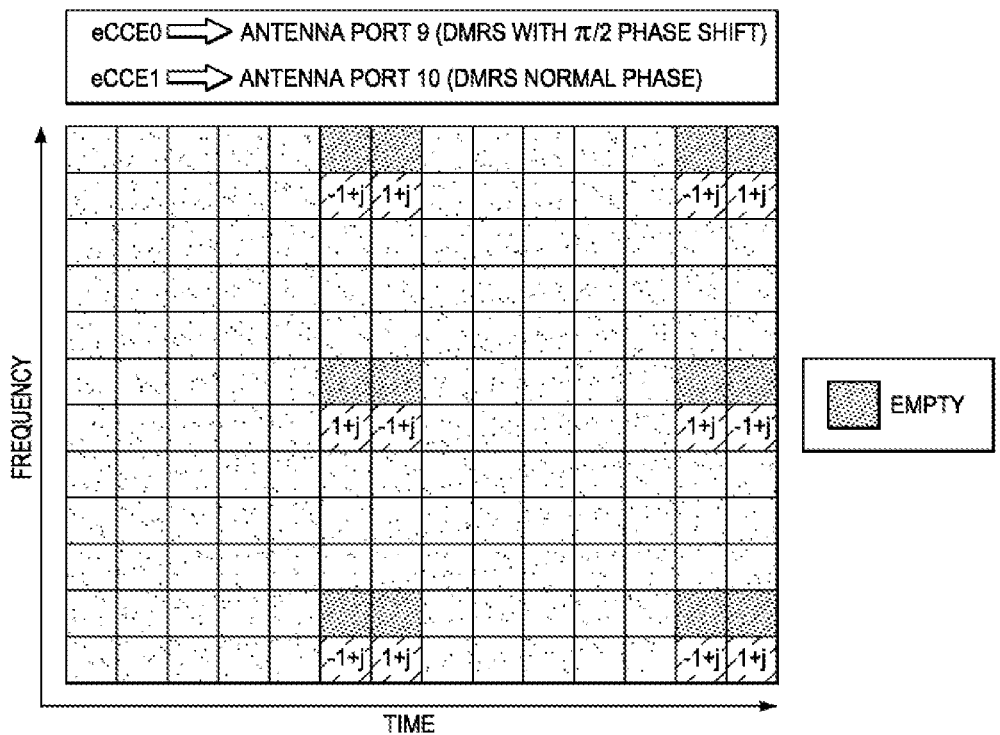
FIG. 15(b) illustrates a diagram of a yet another embodiment of an RB or RB pair that is communicated according to the method depicted in FIG. 13.

FIG. 15(*a*) illustrates an embodiment of an RB 1500 that is communicated according to the method 1300. The RB 1500 carries an eCCE0 corresponding to antenna port 9 and an eCCE1 corresponding to antenna port 10. In this example, the DMRS corresponding to antenna port 10 is multiplied by a complex constant having a phase shift of $\pi/2$ such that the complex reference signal <1+j, 1−j, 1+j, 1−j> is communicated in the RB 1500.

FIG. 15(*b*) illustrates an embodiment of an RB 1550 that is communicated according to the method 1300. The RB 1550 carries an eCCE0 corresponding to antenna port 9 and an eCCE1 corresponding to antenna port 10. In this example, the DMRS corresponding to antenna port 9 is multiplied by a complex constant having a phase shift of $\pi/2$ such that the complex reference signal <1+j, −1+j, 1+j, −1+j> is communicated in the RB 1550.

Generally, two codes c*<1,1,1,1>, c*<j,−j,j,−j> can be used for multiplexing two DMRS. "c" is a complex constant. "j" is used to indicate the imaginary part of a complex number.

Figure 16D:
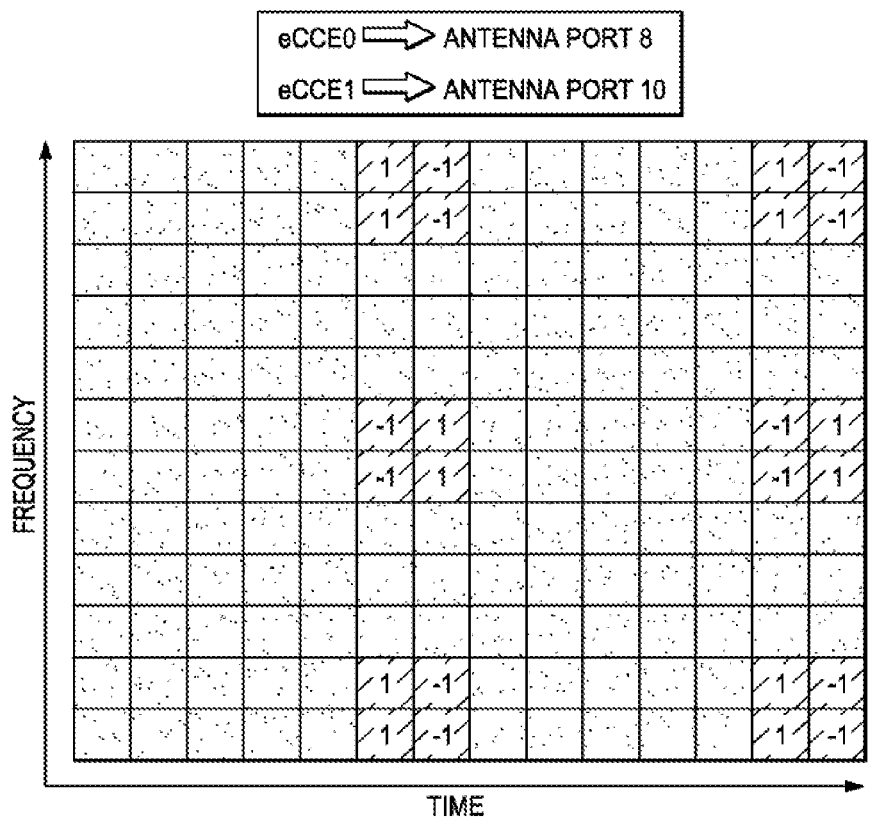
FIG. 16(*a*) illustrates a diagram of an embodiment of an RB or RB pair that includes resource allocations that are selectively allocated to antenna ports that do not have overlapping DMRSs.

Another technique for avoiding the aforementioned zero power problem is to allocate, to the control channel elements, antenna ports having non-conflicting reference signals (i.e., reference signals whose symbols do not overlap in the time-frequency domain). FIG. 16(*a*) illustrates an embodiment of an RB 1610 that carries an eCCE0 and an eCCE1. As shown, the eCCE0 has been allocated to antenna port 7 and the eCCE1 has been allocated to antenna port 9. Since antenna ports 7 and 9 are associated with non-overlapping DMRSs, there is no zero power problem in the RB 1610.

FIG. 16(*b*) illustrates an embodiment of an RB 1620 that carries an eCCE0 and an eCCE1. As shown, the eCCE0 has been allocated to antenna port 7 and the eCCE1 has been allocated to antenna port 10. Since antenna ports 7 and 10 are associated with non-overlapping DMRSs, there is no zero power problem in the RB 1620.

FIG. 16(*c*) illustrates an embodiment of an RB 1630 that carries an eCCE0 and an eCCE1. As shown, the eCCE0 has been allocated to antenna port 8 and the eCCE1 has been allocated to antenna port 9. Since antenna ports 8 and 9 are associated with non-overlapping DMRSs, there is no zero power problem in the RB 1630.

FIG. 16(*d*) illustrates an embodiment of an RB 1640 that carries an E-PDCCH that comprises an eCCE0 and an eCCE1. As shown, the eCCE0 has been allocated to antenna port 8 and the eCCE1 has been allocated to antenna port 10. Since antenna ports 8 and 10 are associated with non-overlapping DMRSs, there is no zero power problem in the RB 1640.

Another technique for avoiding the aforementioned zero power problem is to assign a common antenna port to each control channel element in an E-PDCCH, such that a common DMRS is used to perform channel estimation for the entire E-PDCCH. An antenna port is an index assigned to a DMRS to differentiate that DMRS from other DMRSs. The resource partition and its corresponding DMRS with the same antenna port have the same virtual antenna, and hence the same channel response after precoding.

In some embodiments, signaling may be used to inform UEs that one or more antenna ports are associated with a resource partition (or eCCE). In the same or other embodiments, one or more antenna ports may be associated with a resource partition (or eCCE) in a standardized specification (e.g., 3GPP LTE rel-11), or otherwise pre-configured according to a parameter, e.g., a UE identity (C-RNTI in 3GPP) and/or a subframe number, etc. Generally, an eCCE may comprise one or more resource partitions. As an example, in FIG. 16(*a*), the antenna port 7 and antenna port 9 for respective CCEs may be predefined in specification or pre-configuration according to UE identity (C-RNTI in 3GPP).

In the eNodeB side, the eNodeB select the resource partitions such as eCCEs to transmit an E-PDCCH. The eNodeB may select one eCCE to transmit the E-PDCCH, or may select multiple eCCE(2,4 eCCEs, etc) to transmit the E-PDCCH. The eNodeB transmits the E-PDCCH. In some embodiments, the UE blindly detects the control channel based on a mapping between resource partitions and the DMRS. In other words, the UE uses the corresponding DMRS of a resource partition (e.g., a eCCE) for channel estimation of the resource partition (e.g., the eCCE). Two or more resource partitions for control channels can be multiplexed in the same RB or RB pair.

Figure 17:
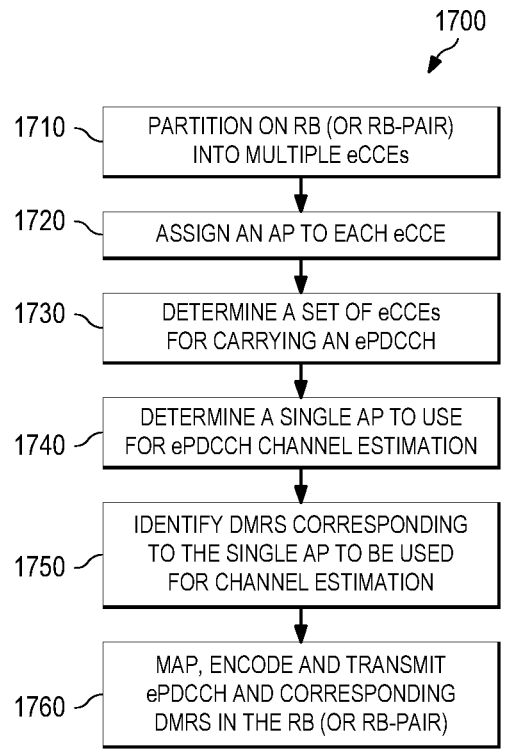
FIG. 17 illustrates a flowchart of another embodiment of a method for transmitting an RB or RB-pair carrying an E-PDCCH.

FIG. 17 illustrates an embodiment of a method 1700 for E-PDCCH transmission. The method 1700 begins at step 1710, where an eNB partitions an RB (or RB-pair) into multiple eCCEs. Next, the method proceeds to step 1720, where each eCCE in the RB (or RB-pair) is assigned an AP. The AP is an index used to differentiate different DMRSs from one another, and hence each eCCE is assigned an AP corresponding to a unique DMRS. The eCCE and its corresponding DMRS share a common virtual antenna, and hence have the same channel response after precoding. Next, the method 1700 proceeds to step 1730, where the eNB selects a set of eCCEs for carrying an E-PDCCH transmission. Thereafter, the method 1700 proceeds to step 1740, where the eNB determines a single AP to use for the E-PDCCH channel estimation. Next, the method 1700 proceeds to step 1750, where the eNB identifies a DMRS corresponding to the AP. Finally, the method 1700 proceeds to step 1760, where the eNB maps, encodes, and transmits the E-PDCCH and corresponding DMRS with the RB (or RB-pair).

Figure 18:
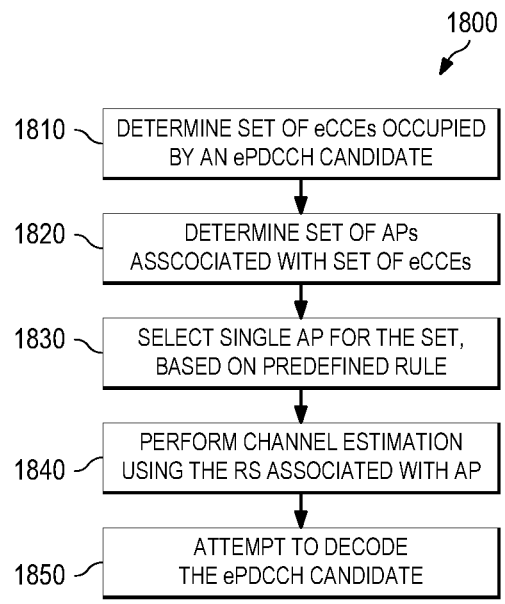
FIG. 18 illustrates a flowchart of a method for receiving the RB or RB pair communicated by the method depicted in FIG. 17.

FIG. 18 illustrates an embodiment of a method 1800 for E-PDCCH reception. The method 1800 begins at step 1810, where the UE determines a set of eCCEs occupied by an E-PDCCH candidate. Next, the method 1800 proceeds to step 1820, where the UE determines a set of APs associated with the set of eCCEs. Thereafter, the method 1800 proceeds to step 1830, where the UE selects a single AP for the set based on a pre-defined rule (e.g., selecting the AP associated with the eCCE having the lowest index). Next, the method 1800 proceeds to step 1840, where the UE performs channel estimation using the DMRS associated with the single AP. Next, the method 1800 proceeds to step 1850, where the UE attempts to decode the E-PDCCH candidate. DMRSs corresponding to each resource partition of a control channel, for a UE may be signaled to the UE. Or a mapping relation between resource partitions and DMRSs may be defined, for example, predefined in specification.

Figure 19:
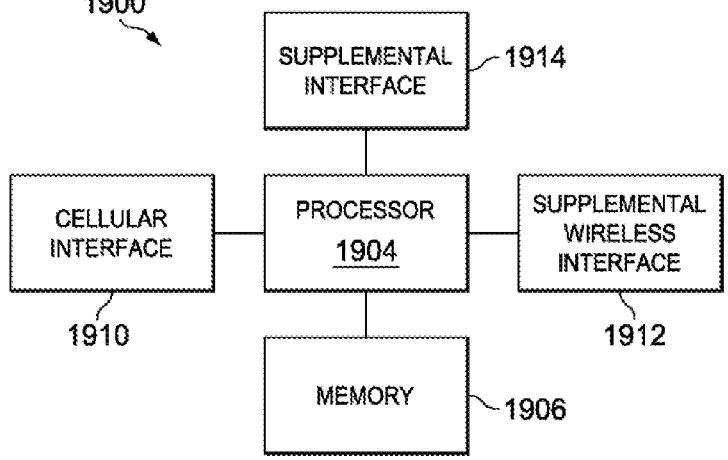
FIG. 19 illustrates a block diagram of an embodiment of a communications device.

FIG. 19 illustrates a block diagram of an embodiment of a communications device 1900, which may be equivalent to one or more devices (e.g., UEs, eNBs, etc.) discussed above. The communications device 1900 may include a processor 1904, a memory 1906, a cellular interface 1910, and one or more supplemental interfaces 1912-1914, which may (or may not) be arranged as shown in FIG. 19. The processor 1904 may be any component capable of performing computations and/or other processing related tasks, and the memory 1906 may be any component capable of storing programming and/or instructions for the processor 1904. The cellular interface 1910 may be any component or collection of components that allows the communications device 1900 to communicate using a cellular signal, and may be used to receive and/or transmit information over a cellular connection of a cellular network. The supplemental interfaces 1912-1914 may be any component or collection of components that allows the communications device 1900 to communicate with other devices via a wireless or wireline protocol.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for decoding at least one resource block (RB) including a first control channel element associated with a first antenna port (AP) and a second control channel element associated with a second AP in a wireless network, comprising:
   determining that the first control channel element and the second control channel element are used for transmission of a single control channel;
   selecting a first reference signal sequence associated with one of the first AP and the second AP for reception of the single control channel based on the lowest control channel index value of a first control channel element index value of the first control channel element and a second control channel element index value of the second control channel element; and
   detecting a resource element of the at least one RB using the first reference signal sequence to decode the first control channel element and the second control channel element.

2. The method of claim 1, wherein the single control channel is an enhanced Physical Downlink Control Channel (E-PDCCH) of a long term evolution (LTE) sub-frame, and wherein the first control channel element and the second control channel element are enhanced control channel elements (eCCEs) of the E-PDCCH.

3. The method of claim 2, further comprising: in response to the selection, detecting the resource element of the at least one RB without using a second reference signal sequence associated with the other of the first AP and the second AP to decode the first control channel element and the second control channel element.

4. The method of 3, further comprising:
   in response to a determination that the first control channel element and the second control channel element are used for transmission of different control channels, detecting the resource element of the at least one RB using both the first reference signal sequence and the second reference signal sequence to decode the first control channel element and the second control channel element, respectively.

5. The method of 2, wherein the step of detect a resource element of the at least one RB using the first reference signal sequence comprises: performing channel estimation for both the first control channel element and the second control channel element using the first reference signal sequence.

6. A user equipment (UE) in a wireless network, comprising:
   a memory comprising instructions; and
   a processor configured to read the instructions stored in the memory, and execute instructions that cause the processor to, the programming including instructions to:
   determine that a first control channel element associated with a first antenna port (AP) and a second control channel element associated with a second AP are used for transmission of a single control channel carried in at least one resource block (RB);
   select a first reference signal sequence associated with one of the first AP and the second AP for reception of the single control channel based on the lowest control channel index value of a first control channel element index value of the first control channel element and a second control channel element index value of the second control channel element; and
   detect a resource element of the at least one RB using the first reference signal sequence to decode the first control channel element and the second control channel element.

7. The UE of claim 6, wherein the single control channel is an enhanced Physical Downlink Control Channel (E-PDCCH) of a long term evolution (LTE) sub-frame, and wherein the first control channel element and the second control channel element are enhanced control channel elements (eCCEs) of the E-PDCCH.

8. The UE of claim 7, wherein the instructions to detect the resource element of the at least one RB comprises: instruction to detect the resource element of the at least one RB without using a second reference signal sequence associated with the other of the first AP and the second AP to decode the first control channel element and the second control channel element.

9. The UE of 8, wherein the program further includes instructions to: in response to a determination that the first control channel element and the second control channel element are used for transmission of different control channels, detect the resource element of the at least one RB using both the first reference signal sequence and the second reference signal sequence to decode the first control channel element and the second control channel element, respectively.

10. The method of 7, wherein the instructions to detect a resource element of the at least one RB using the first reference signal sequence comprise: instructions to perform channel estimation for both the first control channel element and the second control channel element using the first reference signal sequence.

\* \* \* \* \*